United States Patent
Huang

(10) Patent No.: US 9,830,145 B2
(45) Date of Patent: Nov. 28, 2017

(54) SYSTEMS AND METHODS FOR INFRASTRUCTURE AND MIDDLEWARE PROVISIONING

(75) Inventor: Yih-Jen Huang, Purcellville, VA (US)

(73) Assignee: FEDERAL HOME LOAN MORTGAGE CORPORATION (FREDDIE MAC), McLean, VA (US)

( * ) Notice: Subject to any disclaimer, the term of this patent is extended or adjusted under 35 U.S.C. 154(b) by 577 days.

(21) Appl. No.: 11/503,136

(22) Filed: Aug. 14, 2006

(65) Prior Publication Data
US 2008/0065993 A1  Mar. 13, 2008

(51) Int. Cl.
G06F 3/0482 (2013.01)
G06F 3/0483 (2013.01)
G06F 3/0481 (2013.01)
G06Q 30/02 (2012.01)
G06F 9/44 (2006.01)

(52) U.S. Cl.
CPC ..................... G06F 8/71 (2013.01)

(58) Field of Classification Search
CPC .. G06F 3/0482; G06F 3/0481; G06F 3/04817; G06F 9/4443; G06F 17/3089; G06F 17/30867; H04N 5/44543; G06Q 30/02
USPC ........ 715/745, 733, 744, 810, 764; 709/226, 709/217
See application file for complete search history.

(56) References Cited

U.S. PATENT DOCUMENTS

| | | | |
|---|---|---|---|
| 5,875,394 A * | 2/1999 | Daly et al. ..................... | 455/411 |
| 6,275,693 B1 * | 8/2001 | Lin et al. ..................... | 455/414.3 |
| 6,373,930 B1 * | 4/2002 | McConnell .......... | H04M 15/88 379/114.17 |
| 6,538,998 B1 * | 3/2003 | Garimella .............. | G06Q 10/10 370/241 |
| 6,556,997 B1 * | 4/2003 | Levy ............................... | 707/10 |
| 6,647,260 B2 * | 11/2003 | Dusse et al. .................. | 455/419 |
| 6,978,132 B1 * | 12/2005 | Sladek et al. .............. | 455/432.2 |
| 7,171,659 B2 * | 1/2007 | Becker et al. ................ | 717/171 |
| 7,188,177 B2 * | 3/2007 | Taylor ........................... | 709/227 |
| 7,280,529 B1 * | 10/2007 | Black et al. .................. | 370/352 |
| 7,281,037 B2 * | 10/2007 | Bahlmann ..................... | 709/221 |
| 7,340,057 B2 * | 3/2008 | Martin et al. ................ | 380/247 |
| 7,392,539 B2 * | 6/2008 | Brooks et al. .................. | 726/11 |
| 7,490,342 B2 * | 2/2009 | Echigo et al. .................. | 725/46 |
| 7,603,469 B2 * | 10/2009 | Fletcher et al. .............. | 709/229 |

(Continued)

OTHER PUBLICATIONS

Environment Management Systems Candidate Architecture, Version 1.0, Freddie Mac (2005) (31 pages).

Primary Examiner — Kevin L Young
Assistant Examiner — Erik Stitt
(74) Attorney, Agent, or Firm — Finnegan, Henderson, Farabow, Garrett & Dunner L.L.P.

(57) ABSTRACT

Systems, methods, and computer readable media are provided for provisioning a service using a web-based user interface. An exemplary method may include establishing, using the web-based user interface, a profile including one or more services; and configuring an environment by specifying a computer to use for provisioning the one or more services in the profile. Furthermore, the method may include provisioning the one or more services in the configured environment, such that the one or more services generate a return code indicating a status of the provisioning.

23 Claims, 12 Drawing Sheets

(56) References Cited

U.S. PATENT DOCUMENTS

| | | | |
|---|---|---|---|
| 7,633,935 B2* | 12/2009 | Hook | H04L 49/252 370/360 |
| 7,827,294 B2* | 11/2010 | Merkow et al. | 709/229 |
| 7,908,589 B2* | 3/2011 | Sattler et al. | 717/121 |
| 2002/0035636 A1* | 3/2002 | Gitsels et al. | 709/230 |
| 2002/0065758 A1* | 5/2002 | Henley | 705/37 |
| 2002/0158898 A1* | 10/2002 | Hsieh et al. | 345/736 |
| 2002/0191014 A1* | 12/2002 | Hsieh et al. | 345/738 |
| 2003/0079047 A1* | 4/2003 | Fitts et al. | 709/310 |
| 2003/0083081 A1* | 5/2003 | Sanders et al. | 455/466 |
| 2003/0097422 A1* | 5/2003 | Richards et al. | 709/217 |
| 2003/0143946 A1* | 7/2003 | Grzeczkowski | 455/3.05 |
| 2004/0024843 A1* | 2/2004 | Smith | 709/219 |
| 2004/0068565 A1* | 4/2004 | Polan et al. | 709/226 |
| 2004/0268258 A1* | 12/2004 | Lee et al. | 715/708 |
| 2005/0027575 A1* | 2/2005 | Amitabh et al. | 705/8 |
| 2005/0080801 A1* | 4/2005 | Kothandaraman et al. | 707/100 |
| 2005/0228853 A1* | 10/2005 | Yamamura et al. | 709/200 |
| 2006/0010234 A1* | 1/2006 | Reedy et al. | 709/224 |
| 2007/0014243 A1* | 1/2007 | Meyer et al. | 370/249 |
| 2007/0038739 A1* | 2/2007 | Tucker | H04L 41/0853 709/224 |
| 2007/0083588 A1* | 4/2007 | Keller et al. | 709/202 |
| 2007/0268392 A1* | 11/2007 | Paalasmaa et al. | 348/333.02 |
| 2008/0082546 A1* | 4/2008 | Meijer et al. | 707/10 |
| 2008/0082667 A1* | 4/2008 | Meijer et al. | 709/226 |
| 2008/0133734 A1* | 6/2008 | Jacobs et al. | 709/223 |

\* cited by examiner

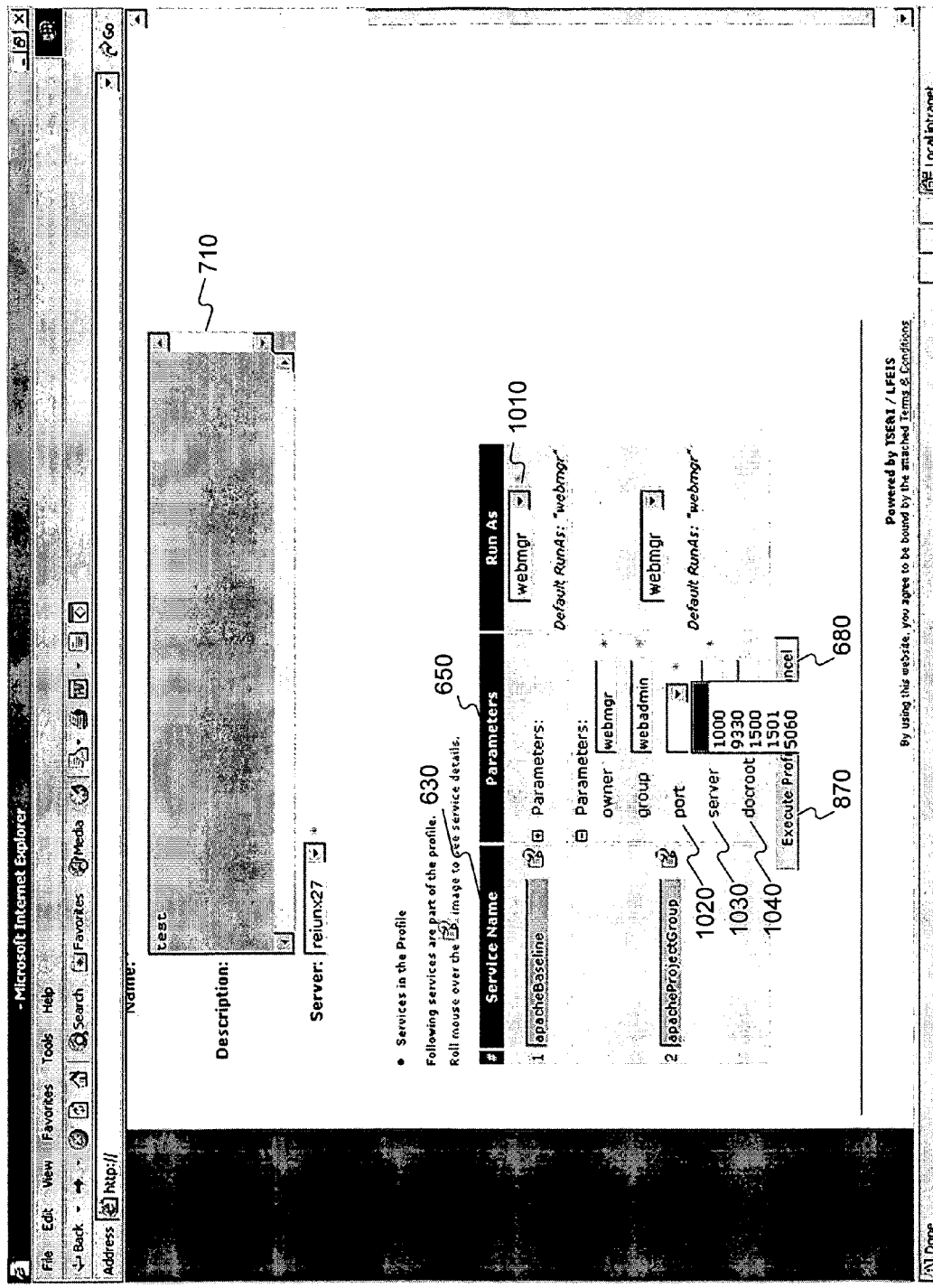

| # | DATE | TIME | ACTION | FEATURE | VRTL_ENV | TIER | HOST | ENGINEER | DETAILS | STATUS | LINK |
|---|---|---|---|---|---|---|---|---|---|---|---|
| 1 | 2006-04-27 | 19:29:15 | Bounce | PRICING | dev | | reiunx59 | John Doe | pricing2MServer bounce was successful | SUCCESS | |
| 2 | 2006-04-27 | 19:30:04 | Bounce | PRICING | dev | | reiunx59 | Jane Doe | pricing2MServer bounce was successful | SUCCESS | |
| 3 | 2006-05-04 | 13:21:40 | Build | PRICING | | | reiunx59 | Joe Doe | BUILD SUCCESSFUL, check logs for details | SUCCESS | |
| 4 | 2006-05-05 | 13:11:20 | Build | PRICING | | | reiunx59 | John Doe | Please check logs at /export/home/imabmgr/logs/PRICING/build_pricing-common_05052006_011117.out | SUCCESS | |
| 5 | 2006-05-05 | 13:12:58 | Build | PRICING | | | reiunx59 | John Doe | BUILD FAILED, check either the ems logs directory | FAIL | |
| 6 | 2006-05-05 | 13:24:51 | Build | PRICING | | | reiunx59 | John Doe | BUILD FAILED, check either the ems logs directory | FAIL | |
| 7 | 2006-05-05 | 13:32:15 | Build | PRICING | | | reiunx59 | John Doe | BUILD SUCCESSFUL, check logs for details | SUCCESS | |
| 8 | 2006-05-05 | 13:33:26 | Build | PRICING | | | reiunx59 | John Doe | BUILD SUCCESSFUL, check logs for details | SUCCESS | |
| 9 | 2006-05-05 | 13:34:58 | Build | PRICING | | | reiunx59 | John Doe | BUILD SUCCESSFUL, check logs for details | SUCCESS | |
| 10 | 2006-05-05 | 13:35:59 | Deploy | PRICING | dev | | reiunx59 | John Doe | deploy was successful | SUCCESS | |
| 11 | 2006-05-12 | 07:48:33 | Bounce | PRICING | dev | | reiunx59 | John Doe | pricing2AServer bounce was successful | SUCCESS | |
| 12 | 2006-05-12 | 07:49:15 | Bounce | PRICING | dev | | reiunx59 | John Doe | pricing2MServer bounce was successful | SUCCESS | |
| 13 | 2006-06-07 | 15:30:31 | Build | PRICING | | | reiunx59 | John Doe | BUILD SUCCESSFUL, check logs for details | SUCCESS | |
| 14 | 2006-06-21 | 09:50:48 | Bounce | PRICING | | | reiunx59 | John Doe | pricing2AServer bounce failed | FAIL | |

1100

FIG. 11

SYSTEMS AND METHODS FOR INFRASTRUCTURE AND MIDDLEWARE PROVISIONING

BACKGROUND

I. Field of the Invention

The present invention generally relates to software development tools and, more particularly, to methods and systems for providing software automation tools.

II. Background

Companies spend significant resources creating, testing, installing, and configuring software products. Dozens, hundreds, or even thousands of servers may need software installed and configured. Companies may hire a number of employees to install, configure, and maintain software products on these servers, and each configuration for software products may use different environments. An environment may be the hardware and software configuration of one or more computers, including a graphical user interface, operating system, networking interface, programming tools, database types, and the like.

Different environments may be used to accommodate varying needs of a company. For example, an environment for a software program in the development stage may be different from the environment in a testing stage, which may be different from the environment in a production stage. Companies often utilize an Information Technology (IT) department with a number of employees to develop these environments on the company's servers.

A number of different users may interact with and maintain this software and the environments on which it runs. During a development stage, a user such as an engineer or software programmer may interact with an environment while developing a software program. In a testing stage, an employee in charge of testing the software program may interact with one or more environments to ensure that the software program will properly work in a variety of environments. During testing and production stages, one or more network managers and engineers may configure an environment for the installation of the software product. End users may then interact with the environments to use the software products for their business needs. Users in the testing and production stages may divided into two categories: system administrators, responsible for low-level configuration of the software products such as the network configurations, creation of user identifiers, and the like; and deployers, who may perform higher-level configuration of software products such as middleware. Middleware may be defined as a software layer that lies between an operating system and the applications installed on computers and that allows the applications to execute using bundled services provided by the middleware. These users and roles are exemplary only, as companies may assign employees to unique tasks.

IT departments also may ensure that the software products are updated regularly. However, the process of updating such a software product may cause reliability issues. Sometimes, the software update itself contains errors. Other times, the software update may not be properly installed. For example, a company that updates their software may not have adequately tested the updated software to ensure reliability on all of the environments that users may choose to operate the software with.

This process of developing, testing, installing, and configuring environment components including software products—all of which may occur as part of provisioning—is time consuming and leads to errors when performed manually by users. For example, if a user responsible for testing software enters incorrect values for the configuration of a testing environment, the results will be wrong. Even if a software product is properly tested, it still must be installed and configured in different environments on potentially thousands of servers, which can also lead to errors. This process of manually testing, installing, and configuring software in varying environments is prone to errors, time consuming, and expensive.

Accordingly, a need exists to provide automated provisioning of software products.

SUMMARY

The present invention provides methods and apparatus, including computer program products, for provisioning software products and, specifically, provisioning a service using a web-based interface. An exemplary method may include establishing, using the web-based user interface, a profile including one or more services; and configuring an environment by specifying a computer to use for provisioning the one or more services in the profile. Furthermore, the method may include provisioning the one or more services in the configured environment, such that the one or more services generate a return code indicating a status of the provisioning.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

FIG. 10 illustrates an exemplary user interface for configuring provisioning of software, consistent with certain aspects related to the present invention;

FIG. 11 illustrates an exemplary user interface for displaying results of provisioning software, consistent with certain aspects related to the present invention.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
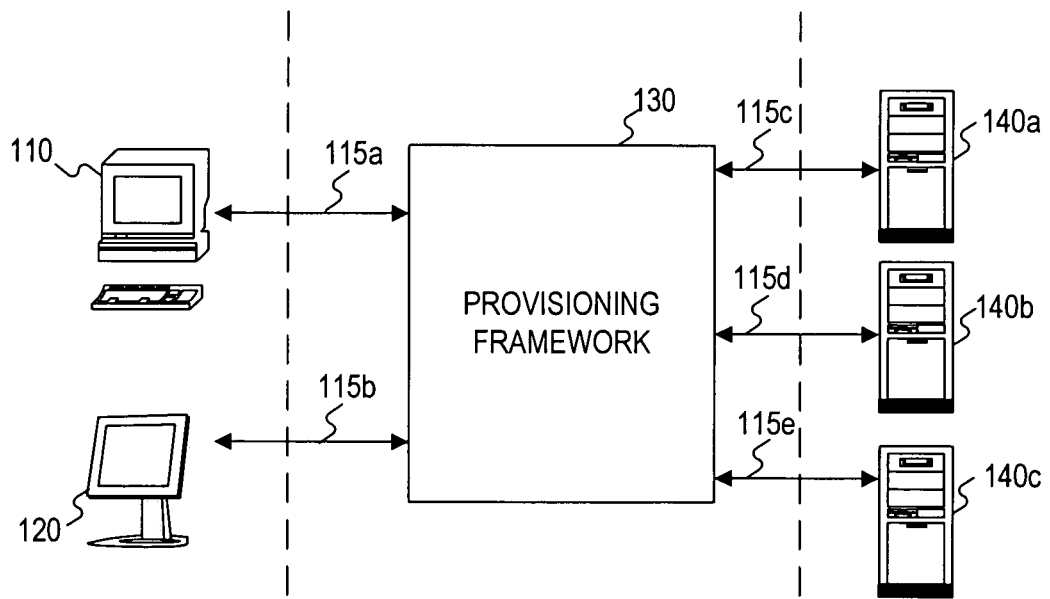
FIG. 1 illustrates a block diagram of an exemplary system, consistent with certain aspects related to the present invention.

FIG. 1 illustrates an exemplary block diagram of a system 100, consistent with certain aspects related to the present invention. System 100 may include a client 110, network connections 115a-e, an operator terminal 120, a provisioning framework 130, and a plurality of computers 140a-c.

System 100 may provide a set of automated utilities to provision environment components using services in a variety of environments. A service may be software functionality that performs a specific task or operation, such as an infrastructure provisioning operation or a middleware provisioning operation. A provisioning operation may be an operation that installs and enables a software program to execute on one or more computers. The automated utilities may allow infrastructure configuring operations and configuration of middleware products that will be used by the software products. Examples of infrastructure operations include installing a file system, creating a user identifier for client 110, installing software on computers 140a-c, and configuring software on computers 140a-c. Automated utilities provided by system 100 may also include running a test of software products and any other software based task or operation.

Simple programs, such as an Internet browser, can be installed on a variety of computers, such as client 110 and computer 140, without much configuration. However, more complex programs may be provisioned for varying environments including more than one computer 140, each of which may utilize different configurations of hardware and software, such as different operating systems (e.g., Microsoft Windows®, UNIX®, Linux®), and network protocols. In order to install a complex program across such an environment, the process of provisioning requires more involved configuration. Moreover, the configuration may need to be customized depending on the life cycle of a software program. An environment for a project in the development stage may be different from the environment in a testing stage, which may be different from the environment in a deployment stage. A project may be a bundle of one or more software programs and hardware components designed to serve a business need. For example, a project may be developed in a development environment including a configuration of computers and software, but in a deployment state the software program may have a completely different environment. System 100 allows provisioning of software products in unique environments using a web-based interface.

Client 110 may select and configure an environment to use for provisioning environment components. Configuration of an environment may include infrastructure operations, such as specifying computers 140a-c to include in the environment and specifying directories and file systems in these computers that the environment uses. Configuration of an environment may also include middleware provisioning, that is, installation and configuration of middleware products such as Tomcat™, Apache®, WebLogic®, and Web Methods®, that the environment should implement. System 100 may also allow client 110 to provide additional configurations, such as whether an environment automatically times out a client 110 after a given amount of time.

Using the configuration provided by client 110, provisioning framework 130 may establish the environment using computers 140a-c. The framework enforces a protocol which allows different software products to exchange information. Client 110 may then request that provisioning framework 130 provision the services using the environment selected and/or configured for that service. Provisioning framework 130 may monitor the provisioning and provide the results of the test to client 110. This process will be described in more detail below with respect to FIG. 2 and FIG. 4.

Client 110 may be a computer, such as a personal computer, capable of executing local software products, such as a web-browser. A user of client 110 may identify and configure services to provision. For example, as described in more detail below, client 110 may facilitate indicating which software products to provision, indicating the order in which to provision the software products, and configuring an environment on which to provision the software products. Client 110 may also provide a graphical user interface, which may be web-based, that allows users to interact with software provided by client 110, provisioning framework 130, and/or computers 140a-c. Exemplary web-based graphical user interfaces will be illustrated with respect to FIGS. 6-11 below. The web-based graphical user interfaces may be implemented using, for example, Microsoft Internet Explorer® or Netscape® Browser, although other web-based graphical user interfaces may be used.

The web-based graphical user interface may be based on a flexible application program interface such that third party products can interface with provisioning framework 130. For example, provisioning framework 130 may allow execution of a third party scheduling tool. Operator terminal 120 may provide similar functionality to client 110, but be based on a command line interface. Although FIG. 1 depicts only a single client 110, a plurality of clients may be implemented as well.

Computers 140a-c may be used to configure and host an environment and provision services in the order selected by client 110. Computers 140a-c may be server computers including one or more processors, and may be distributed or contained within a single unit. Computers 140a-c may include computer-readable media storing a variety of databases that provisioning framework 130 may access when executing services.

System 100 may also facilitate deployment and rollback of software programs, including operating systems, and "patches" to the software programs on different computers 140a-c. Rollback may be the process of returning a software program to an earlier state, such as a previous version. System 100 may facilitate deployment and rollback of software programs in an environment including, for example, Sun Solaris®, Linux®, Windows NT®, Advanced IBM UNIX® (AIX), Universal Databases® (commercially available from IBM), WebLogic® (available from BEA, San Jose, Calif.), WebMethods® (Fairfax, Va.), and/or Apache Web Server®. System 100 may also be integrated with other software programs, which may be implemented in any programming language, such as Java®, Java® Servlet Page, C++, and UNIX® shell scripts.

Network connections 115a-e may connect system 100 and may include, alone or in any suitable combination, a telephony-based network, a local area network (LAN), a wide area network (WAN), a dedicated intranet, wireless LAN, the Internet, a wireless network, a bus, or any other any communication mechanisms. Further, any suitable combination of wired and/or wireless components and systems may be used to provide connections 115a-e using bi-directional, unidirectional, and/or dedicated communication links.

Figure 2:
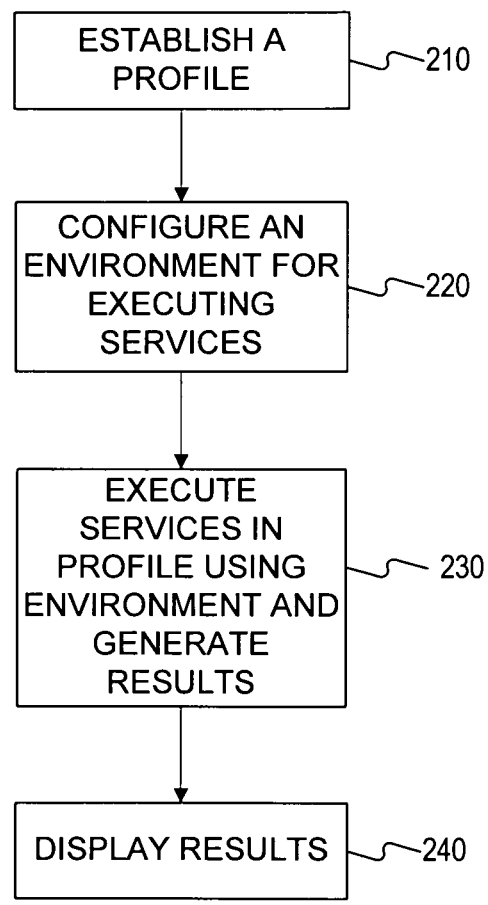
FIG. 2 illustrates a flowchart of an exemplary method for provisioning software, consistent with certain aspects related to the present invention.

FIG. 2 illustrates a flowchart of an exemplary method performed by system 100, consistent with certain aspects related to the invention. At step 210, client 110 may establish a profile to be stored by provisioning framework 130 by, for example, creating a profile and adding services to the profile. A profile may be a sequence of services. Client 110 may select one or more services to include in the profile, provide values for parameters required to execute the services, and alter the order of services in the profile. For example, client 110 may select services to include in the profile from a drop-down menu on the web-based user interface, as described with respect to FIG. 6, and alter the order of services in a profile as described with respect to FIG. 7. An example of a service is "creating a directory structure." This service may receive parameters used to perform infrastructure operations, thus automating the process of system administration. For example, the service may receive parameters indicating an owner, a GID, a directory, and a run-as user. The owner is the UNIX user identifier which owns the directory being created, the GID is the GID which owns the directory being created, and the directory is the directory structure being created in the environment on computer 140a. The run-as user may be the user identifier that will execute service 630, as described in more detail below.

At step 220, client 110 may configure an environment to be used for executing services to provision software products. Configuring an environment may include identifying resources required to fulfill the profile, which may include, for example, identify computers 140a-c to use for executing the profile, identifying ports on computers 140a-c to use for communication between provisioning framework 130 and computers 140a-c, and identifying a root directory to use for provisioning a software product. An automatic modeler may also be used to predict the best resource candidates based on, for example, the configuration criteria, history runtime statistics, and current system configuration.

At step 230, client 110 may request that provisioning framework 130 provision a software product to a set of assigned resources which constitute the requested environment using services. Provisioning framework 130 may retrieve the values for the parameters provided by client 110, establish the environment using the configuration provided by client 110 (step 220), and execute the services in a profile. The environment may be established by reserving a portion of memory and processing capabilities on each computer 140 that will be used in executing the service. An example of executing services will be provided with respect to FIG. 12 below. Results of executing the services may be generated for display, as described in step 240.

At step 240, provisioning framework 130 may display results from executing the services to provision software products in the environment. The results may include, for example, any error codes and descriptions of the error codes generated by the services in step 230, such as "warning," "error," or "success." The results may be provided by provisioning framework 130 to client 110 for display on the client's web-based graphical user interface. An example of providing results to a web-based user interface will be described in more detail with respect to FIG. 11.

Figure 3:
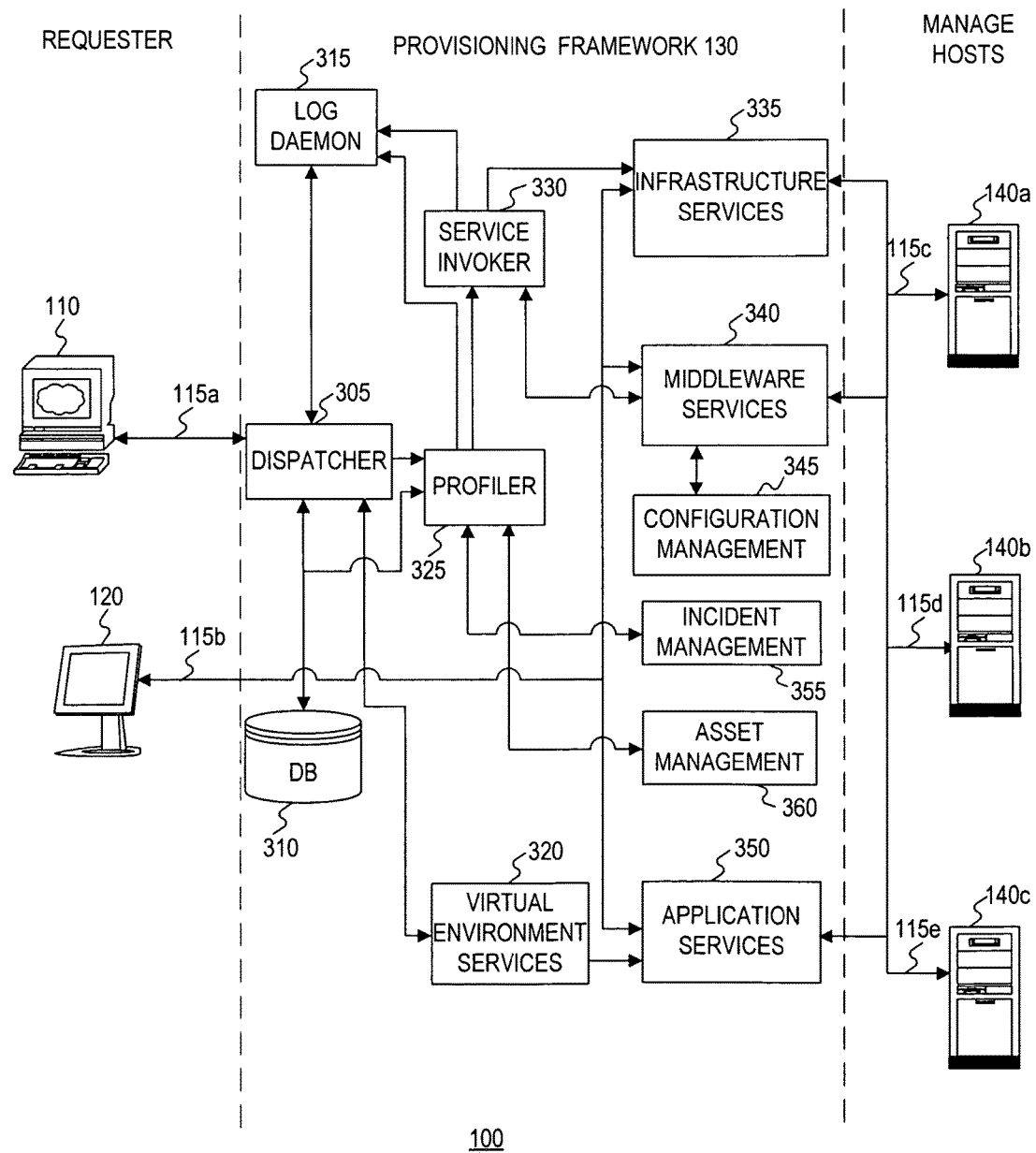
FIG. 3 illustrates a more detailed diagram of the system of FIG. 1, consistent with certain aspects related to the present invention.

FIG. 3 illustrates system 100, with an exemplary implementation of provisioning framework 130, consistent with certain aspects related to the invention. Provisioning framework 130 may include dispatcher 305, database 310, log daemon 315, virtual environment services 320, profiler 325, service invoker 330, infrastructure services 335, middleware services 340, configuration management tool 345, application services 350, incident management tool 355, and asset management tool 360.

Dispatcher 305 may serve as a connection point for client 110 to connect to provisioning framework 130. Dispatcher 305 may obtain initial authorization for client 110 by, for example, requiring that a user enter a username and password to be provided access to provisioning framework 130. Once dispatcher 305 grants a user access to provisioning framework 130, dispatcher 305 may control authorization of client 110 to provision software applications and services in different environments.

Database 310 may store listings of client 110, such as client 110 and/or usernames and passwords which are allowed access to provisioning framework 130 by dispatcher 305. Database 310 may also store metadata for environments. Metadata may be defined as data about data. For example, database 310 may store metadata that defines which client 110 is allowed to access an environment and the description of an environment.

Client 110 may configure an environment using a web-based user interface (e.g., Microsoft Internet Explorer®). The configuration of the environment may be stored in a profile using metadata, allowing a user to easily re-provision the software in the same environment after making additional changes. Configuration of an environment will be described in more detail with respect to FIG. 5 below. Environments may also be converted into other environments, such as converting a development environment into a production environment. To provision a service, client 110 may select a configured environment stored in a database or configure a new environment to use for provisioning.

Log daemon 315 may log access by client 110 to provisioning framework 130, log provisioning of services, and log the computers 140a-c that are assigned to an environment. Log daemon 315 may log provisioning and creation of environments to aid a software developer (e.g., a user at client 110) in identifying problems. Log daemon 315 may present a list of errors to client 110 for each provisioning operation. Log daemon 315 may also store in database 310 records of provisioning and environment configurations so that client 110 may subsequently retrieve the records.

Profiler 325 may organize and group services into a profile. Profiler 325 may execute services of a profile through service invoker 330. Profiler 325 may create, delete, modify, search, and execute infrastructure and middleware profiles. Profiler 325 may also track client profiles and store the client profile configuration parameters as metadata in database 310 for later use. For example, profiler 325 may manage profiles for individual client 110, including monitoring and recording of changes to and executions of profiles. Profiles may be shared between multiple clients. Clients that share access to a given profile may have varying levels of authorization. For example, one client 110 may have authorization to only access and execute services of a profile. However, another client (not shown) may have authorization to access a profile, upload new services to a profile, and change the execution order of services in a profile. The process of creating a profile and configuring services to use with a profile will be described in more detail below.

System 100 may establish an environment as requested by client 110 when the client provisions services in a profile. Once provisioning framework 130 creates the environment on one or more of computers 140a-c by, for example, reserving a portion of the computer's memory and processing capabilities. Moreover, dispatcher 305 may notify client 110 that the environment is ready for use in provisioning the services. A user at client 110 may then request that a profile be executed using the environment, as described below with respect to FIG. 5 and FIG. 12.

A service may return to service invoker 330 data during and after execution of the service. The data may include, for example, status codes generated during execution of the service, which may be propagated by service invoker 330 and profiler 325 to storage, log daemon 315, and/or client 110. For example, a service may return a status code to service invoker 330, which may propagate using profiler 325 the error code to client 110 for consideration. Exemplary status codes include a "warning," an "error," or "success," which may indicate the result of executing the service. Service invoker 330 may retrieve error codes from the service, which may include a description of the error code, and provide the error codes to profiler 325. Error codes may be in the form of, for example, an integer lookup table. However, any other method may also be used to return error codes and error code descriptions. Service invoker 330 may also obtain and return to profiler 325 a list of error records, with each error record having an error code and description.

During profile creation and modification, profiler 325 may expose on the web-based user interface at client 110 only the services and environments that the client 110 is authorized to use. Profiler 325 may authorize client 110 based on the client's role, such as a system administrator. Exemplary roles for client 110 include: security service operator, security service administrator, a system service operator, a system service administrator, a network service operator, a network service administrator, a middleware service operator, and a middleware service administrator. A system service administrator may upload, create, delete, and modify services related to system administration. An exemplary system service is creating a file system. A system service operated is authorized to execute the system services. A network service administrator may upload, create, delete, and modify services related to network administration. A network service operator may perform network services created by the network service administrators. A middleware service operator may execute middleware services 340 (described in more detail below). A middleware service administrator may create, delete, and modify middleware services. Clients may be given authorization for one or more of these exemplary roles.

Profiler 325 may also grant clients access to modify profiles, execute services, and access environments using resource based authorization. Resource based authorization may grant permission to clients based not only on their roles, but also based on applicable resources. By granting and maintaining authorization based on resources, privileged accounts, such as system administrator accounts, do not need to be shared. This may provide greater security than using a role-based authorization system alone.

Service invoker 330 may invoke services as requested by profiler 325. These services may be distributed across different environments, including different computers 140a-c, and may require access to various resources in order to execute their functionality. For example, service invoker 330 may invoke a service (as described in more detailed with respect to FIG. 12) that requires access to a database at configuration management 345, a database at incident management 355, and/or a database at asset management 360.

A service may follow a standard, such as receiving from service invoker 330 a defined set of parameters that may be verified by the service invoker prior to executing the service. A parameter may be an input variable that is required to execute the service's functionality. For example, a service designed to create a UNIX directory may receive parameters including, for example, the directory name, directory owner ID, group ID, and default mask. Service invoker 330 may retrieve services from a repository, such as configuration management 345 (as described below), and execute the service with the required set of parameters. An example of invoking a service will be provided with respect to FIG. 12 below.

Service invoker 330 may obtain a set of parameter records for a service from configuration management 345. Each parameter record may indicate, for example, a parameter name, a parameter type, a parameter length, a parameter description, and an option flag, although additional parameters may also be used. Service invoker 330 may execute a service using the parameters identified in the parameter record.

When client 110 selects services to include in a profile, a list of parameters for the service may be provided to client 110 by profiler 325. Client 110 may provide profiler 325 with values for the required parameters, which may be saved with the profiler 325. When service invoker 330 initiates the services, service invoker 330 may execute the service using the values that client 110 provided. The values that client 110 provides for the parameters of a service may be changed at any time by client 110. An example of selecting a service and providing parameters will be described in more detail with respect to FIG. 5 and FIG. 6 below.

Service invoker 330 may also ensure that client 110 is authorized to execute services and may monitor the execution of services in the environment. Service invoker 330 may authorize execution of services for a client 110 using a username prior to executing the service. In addition, service invoker 330 may invoke other services that perform a lower-level operation such as creating a user identification (e.g., login identification) or creating a file system.

Moreover, service invoker 330 may log the beginning and end of a service using a call to log daemon 315. Service invoker 330 may be implemented in any programming language such as a Korn shell script, Perl Script, or Java.

In order for an environment to be provisioned, three exemplary types of services may be used, namely infrastructure services 335, middleware services 340, and application services 350.

Infrastructure services 335 may provide automation for manual operations that support middleware. These operations may have low complexity and be composed of several shell commands. For example, infrastructure services 335 may provide security for provisioning framework 130, such as allowing a user identifier to be created and creating a file system. Infrastructure services 335 may also create a file system as required by client 110 to run middleware and execute profiles. The file system may be established to support the middleware, so that the middleware can support execution of programs.

Infrastructure services 335 may execute services as requested by service invoker 330. In one embodiment consistent with certain aspects of the present invention, infrastructure services 335 may allow requests to perform operations only from service invoker 330. In that embodiment, all services that system 100 executes to provision a software product may be controlled by service invoker 330.

Middleware services 340 may provide installation and un-installation services for individual middleware products according to the middleware product's specification and customization requirements. Middleware may be defined as a software layer that lies between an operating system and the applications installed on computers 140a-c. For example, a program may be designed to calculate how much a prospective home purchaser can afford. The program may require information, such as the purchaser's credit score and salary, from a database to perform the calculation. In order to retrieve the information from the database, middleware may then handle interfacing with the appropriate databases and services, which may run on a variety of computers 140a-c, to retrieve current mortgage rates and return these to the program. The program may then calculate the risk associated with the prospective home purchaser and determine the maximum amount that a prospective home purchaser can afford.

Middleware services 340 may also perform middleware provisioning and implement functions requested by service invoker 330. In one embodiment consistent with certain aspects of the invention, middleware services 340 may only allow requests to implement services from service invoker 330. For example, middleware services 340 may provision one or middleware products, such as installing an Apache baseline for Apache®, installing Tomcat®, installing WebMethods®, installing WebLogic®, and installing other middleware products.

Middleware services 340 may store and retrieve a baseline image from a central repository, such as configuration management 345. A baseline image may be the configuration of an environment. For example, after client 110 configures an environment to use for provisioning services, the configuration of the environment may be saved using metadata in database 310. This allows client 110 to quickly recall a previously created environment via the middleware services.

Configuration management 345 may control development of services and provide a source code repository that saves the service's source code and middleware implementation. An example of a configuration management 345 tool is ClearCase® (commercially available from IBM, Inc. Armonk, N.Y.), although any other configuration manager may be used. Configuration management 345 may provide a software code repository, allowing different versions of a software product to be selected for provisioning.

Incident management 355 may be a development tool that tracks changes across a service's development lifecycle. When a service is executed in an environment, incident management 355 may create an instance of the request for the service and track it. The service and/or environment configuration will often contain errors that need to be fixed in order for the service to properly function in the environment. Incident management 345 may allow client 110 to review the environment prior to executing the service. Incident management 355 may create a unique number for the service execution to track errors in configurations of environments and to track requests for creation of environments. Incident management 355 may be implemented using, for example, ClearQuest® (commercially available from IBM, Inc., Armonk, N.Y.), although any other incident manager may be used.

Asset management 360 may ensure that a license for use of the middleware or other commercial products used or provisioned by provisioning framework 130. When system 100 provisions a new software product onto computers 140a-c, asset management 360 may obtain a valid license for provisioning the software product. Asset management 360 may be implemented using, for example, Remedy® (commercially available from BMC Software, Inc., Houston, Tex.), although any other asset management program may be used.

Virtual environment services 320 may work with application services 350 to configure an environment defined by metadata stored in database 310. Virtual environment services 320 may request that the environment for provisioning a virtual environment span across a plurality of computers 140a-c, which may use different operating systems such as UNIX® or Microsoft Windows®. An environment may be configured to, for example, include a specified number of computers 140a-c, indicate which directories and file systems to use, indicate which middleware services 340 the environment should implement, and other configurations such as whether the environment automatically times out a client 110 after a given amount of time. Virtual environment services 320 may configure this environment and establish logical partitions on the host computers 140a-c.

Application services 350 may automatically provision an application environment, including distribution the application code and modifying the application configuration according to the metadata retrieved from database 310. For example, application services may provision a SIT environment without any manual operations. Application services 350 may be implemented using, for example, Environment Management System (EMS), developed by Freddie Mac®, although any other product may be used.

Application services 350 may implement an environment converter, which may automatically convert one environment to another environment using metadata stored at database 310. For example, the converter can convert the image and configuration from a SIT environment into the image of a production environment regardless of any discrepancy between the two environments. The SIT environment could comprise only one personal computer, and the production environment could be expanded into a plurality of computers with fully redundant architecture.

Figure 4:
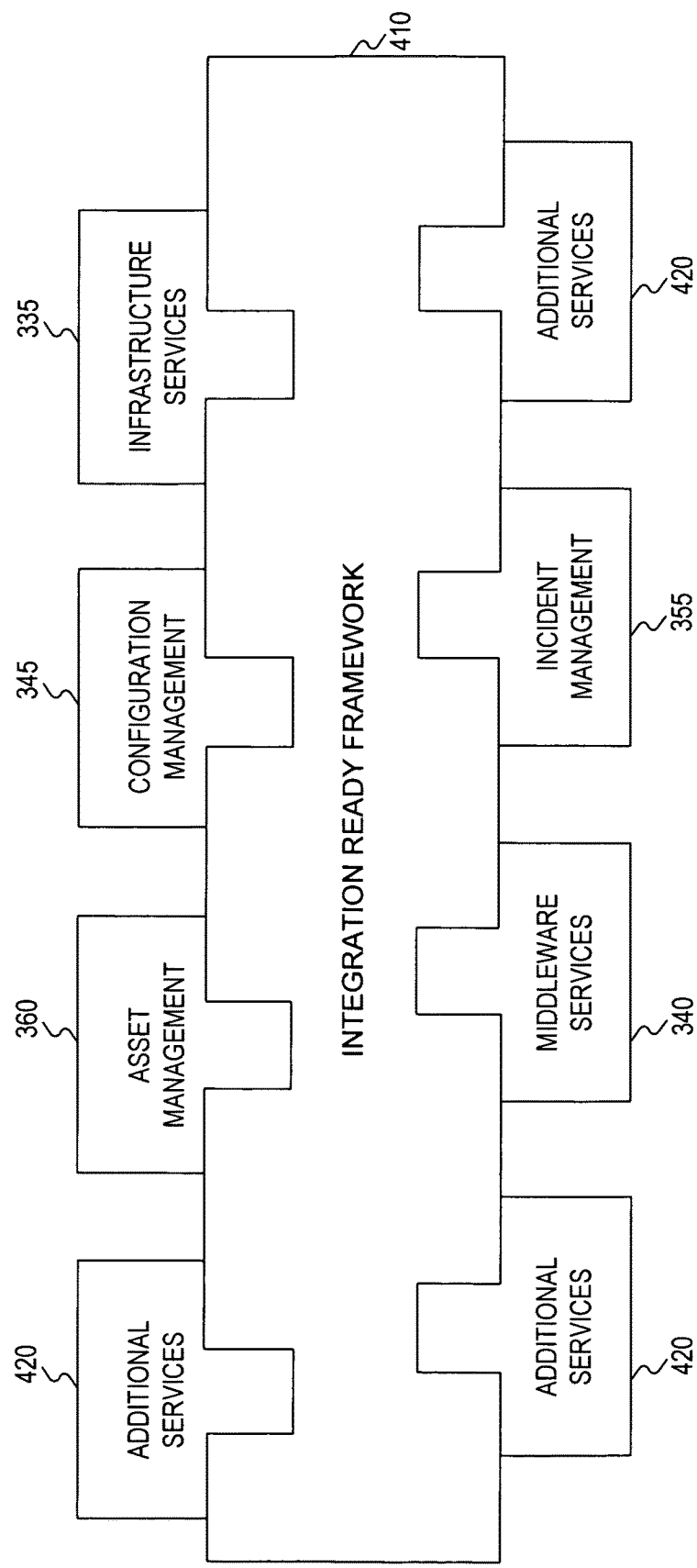
FIG. 4 illustrates a block diagram of an integration ready framework, consistent with certain aspects related to the present invention.

FIG. 4 illustrates an exemplary block diagram illustrating an integration ready framework 410, consistent with certain aspects related to the present invention. Integration ready framework 410 may allow different services to integrate and execute for provisioning. Services installed with integration ready framework 410 may communicate with each other using protocols and messaging, such as MQ, commercially available from IBM®, or WebMethods® Broker. Product command line tools can also be used with customized interfaces to integrate different tools. Exemplary services that may be used with integration ready framework 410 include asset management 360, configuration management 345, infrastructure services 335, middleware services 340, incident management 355, and additional services 420.

Figure 5:
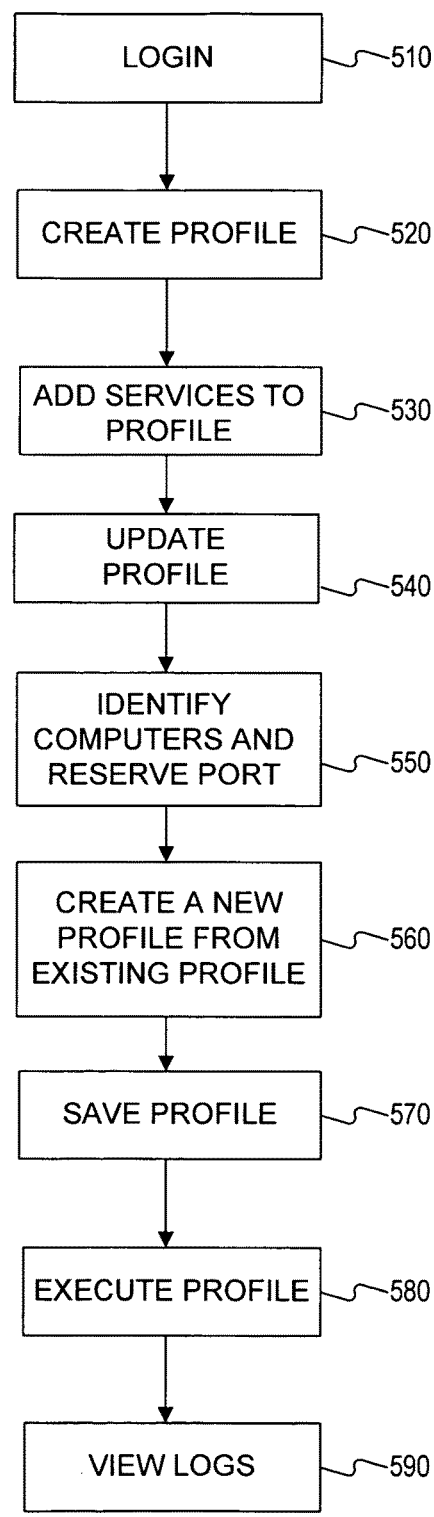
FIG. 5 illustrates a flowchart of an exemplary method for provisioning software, consistent with certain aspects related to the present invention.

FIG. 5 illustrates a flowchart of an exemplary method for establishing and executing a profile, consistent with one embodiment of the present invention. Reference will be made to FIGS. 6-11, while describing the method set forth in FIG. 5. The user interfaces of FIGS. 6-11 may be navigable in any order chosen by client 110 using, for example, links 610a-d as illustrated in FIGS. 6-11.

Steps 510-570 may be performed as part of the step of establishing a profile (FIG. 2, step 210). At step 510 (FIG.

5), client 110 may login to provisioning framework 130 through dispatcher 305. Client 110 may login through a user interface. The user interface may be web-based, that is, provided from a server to a client over a network, such as a secure webpage over the Internet or an intranet. If client 110 is logging onto provisioning framework 130 for the first time, client 110 may be provided with a default user name and password. Dispatcher 305 may then obtain identification information for client 110, including a user name, a user ID, the project that the user is assigned to, an environment type (e.g., development, deployment, etc.) and an activity (e.g., create, edit, execute profile, deploy, bounce, build, administrative).

At step 520 (FIG. 5), client 110 may create a profile to be stored in profiler 325. Client 110 may view a listing of current profiles to which the client 110, as identified by an user ID, is authorized to view, as described below with respect to FIG. 9. Client 110 may begin the process of creating a new profile by expanding the "profiler" link 610a (FIG. 6) and selecting "create." Client 110 may be prompted to enter information for the new profile, such as a profile name 620, a version number for the profile, and a detailed description of the profile. Once client 110 enters this information, a profile may be created and client 110 may be given the option to add services to the profile stored in profiler 325.

Figure 6:
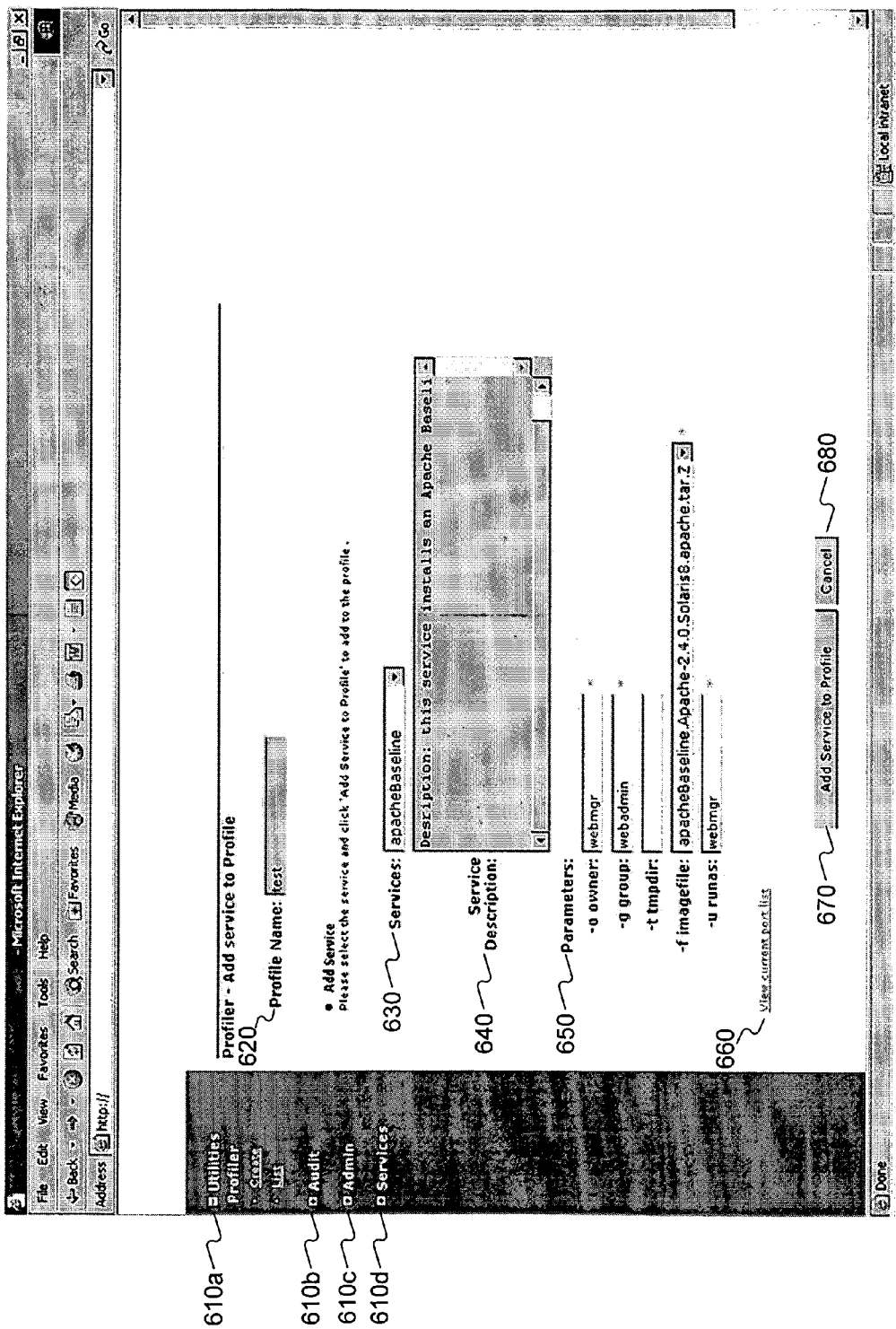
FIG. 6 illustrates an exemplary user interface for adding services to a profile, consistent with certain aspects related to the present invention.

At step 530 (FIG. 5), client 110 may add services to the profile created in step 520. As illustrated in FIG. 6, client 110 may select, from a list of available services 630, which services to include in a profile. The list of available services 630 may include only those services which dispatcher 305 authorized client 110 to view and add to a profile. The list may be created by profiler 325, and client 100 may select the services using a web-based user interface, such as user interface 600. Services may also be loaded from client 110 to profiler 325, to allow a software developer to provision newly developed services. Services that are uploaded and available for viewing by client 110 may be deactivated until a system administrator tests the services to ensure reliability. An activated service may be a service that is available for provisioning, and a deactivated service may be a service that is not yet available for provisioning by client 110. Client 110 may view whether services are activated or deactivated. The loaded services and selected services may be assembled by profiler 325 into a profile.

When selecting or loading a service, client 110 may include a service description 640 that describes the functionality of the service, as well as any required parameters 650. The listing of required parameters 650 may be stored by profiler 325 in a database and automatically provided when client 110 selects a service to add to the profile. Parameters 650 may be provided with default values that client 110 may change. For example, client 110 may wish to change a "tmpdir" parameter to a unique temporary directory that client 110 uses to execute profiles. Required parameters 650 may be marked in a unique way to indicate that they are necessary to execute the selected service 630. For example, required parameters 650 may be marked with an asterisk or in a unique color. Additional parameters 650 that are not required do not need to be filled in by client 110.

Once client 110 completes all of the required fields in user interface 600, client 110 may select to add the service to the profile 670. If client 110 does not enter information for required parameters, client 110 may be warned that adding the service 630 may be refused. However, client 110 may also be allowed to add information for any required parameters at execution time. Once a service is added to a profile, client 110 may be returned to a profile screen (e.g., FIG. 9) which may indicate an updated list of services included in the profile. Client 110 may then edit, delete, or change the order of services prior to saving the profile.

Client 110 may also select a cancel 680 if the information entered is not correct. For example, client 110 may realize that the wrong profile name 620 has been entered, and not want to add a service to the wrong profile. A user may also view a current port list 660 for accessing computers 140a-c, as described below.

An exemplary service 630 is "creating an identifier," which may create a UNIX® user identifier (ID). This service 630 may receive parameters 650 for the user identifier (UID), comment, group identifier (GID), user name, and run-as user. A UID may be automatically created by the UNIX® operating system for a user name, and the UID may be assigned to the created user name. A comment may be any comment associated with a user, and user name may be the name that a user selects or is assigned by, for example, a system administrator.

The GID may indicate the group ID to which the created user identifier belongs. Users may be allowed to perform tasks depending on the group that they are assigned to. Each group may be allowed to perform a set of functions. For example, some users may only be able to read a file; some users may be able to read and write to the file; some users may be able to configure network connections; some users may be in charge of maintaining a database; and some users may be able to install an update to a software program. Additional functions may be assigned to users depending on their role as identified by the GID that the user belongs to. Services 630 may be created and "owned" by different groups. If a user does not belong to the group that a service belongs to, the user may not be able to provision service 630. A run-as user parameter 650 allows a user to act as another user in their role assigned to the group associated with a service 630, such as by granting authorization provided to another user to the run-as user. By acting as another user, the user may execute service 630 and access the environment configuration as part of development, testing, and deployment of services. For example, a user that does not have authorization to update a software product may utilize run-as user parameter 650 to identify another user who is allowed to update a software product. In this manner, run-as user parameter 650 provides additional flexibility in the installation, configuration, and maintenance of software and hardware by allowing user roles to have dynamic functionality. The types of "run-as" user that a user may select may be controlled by, for example, a system administrator in order to maintain security. The "user" for creating an identifier may be client 110.

Other exemplary services 630 include installing an ApacheBaseline (e.g., installing an Apache web server onto a computer 140); installing ApacheProjectGroup (e.g., installing Apache® for a particular group of software developers); installing ApacheProjectVHosts (e.g., installing Apache VHosts for a particular Apache® server); creating an administration service, such as a WebLogic® administration service for controlling WebLogic® servers; creating a WebLogic® managed server (e.g., to control a single WebLogic® server); creating an Apache® instance; creating a WebMethods® integration server (e.g., to allow programs to exchange information); creating a WebMethods® broker server (e.g., to control message handling between servers); creating a directory structure; creating a file system; and creating other services required to handle programs, such as Java® Server page.

Similar to the identifier service 630, each of these other exemplary services may require a unique set of parameters 650 in order to execute the service's functionality. The services 630 described above are exemplary in nature only. System 100 allows services 630 from different vendors to be provisioned by selection through a web-based interface. The parameters 650 for service 630 may be defined by the vendor that creates the service 630. Moreover, services 630 that are not manually installed by client 110 may be installed automatically. For example, if an automated service of provisioning a WebMethods® broker server is available. Therefore, system 100 may automatically install this service 630 on computer 140a to facilitate message handling.

At step 540 (FIG. 5), client 110 may update a profile. Profiles may be updated by adding or removing services, changing the order of services, changing the ports of computers 140a-c reserved for executing the profile, and by making other modifications that client 110 may use to provision services in an environment. By allowing client 110 to update a profile, different configurations can be easily configured and provisioned. In one embodiment consistent with the invention, client 110 may only be allowed to update profiles if the client 110 is the owner (e.g., the original creator) of the profile. If client 110 is not the original creator of the profile, client 110 may create a new profile from the existing profile, becoming the creator of the new profile, and update the new profile, as described below with respect to FIG. 7 and FIG. 9.

Figure 7:
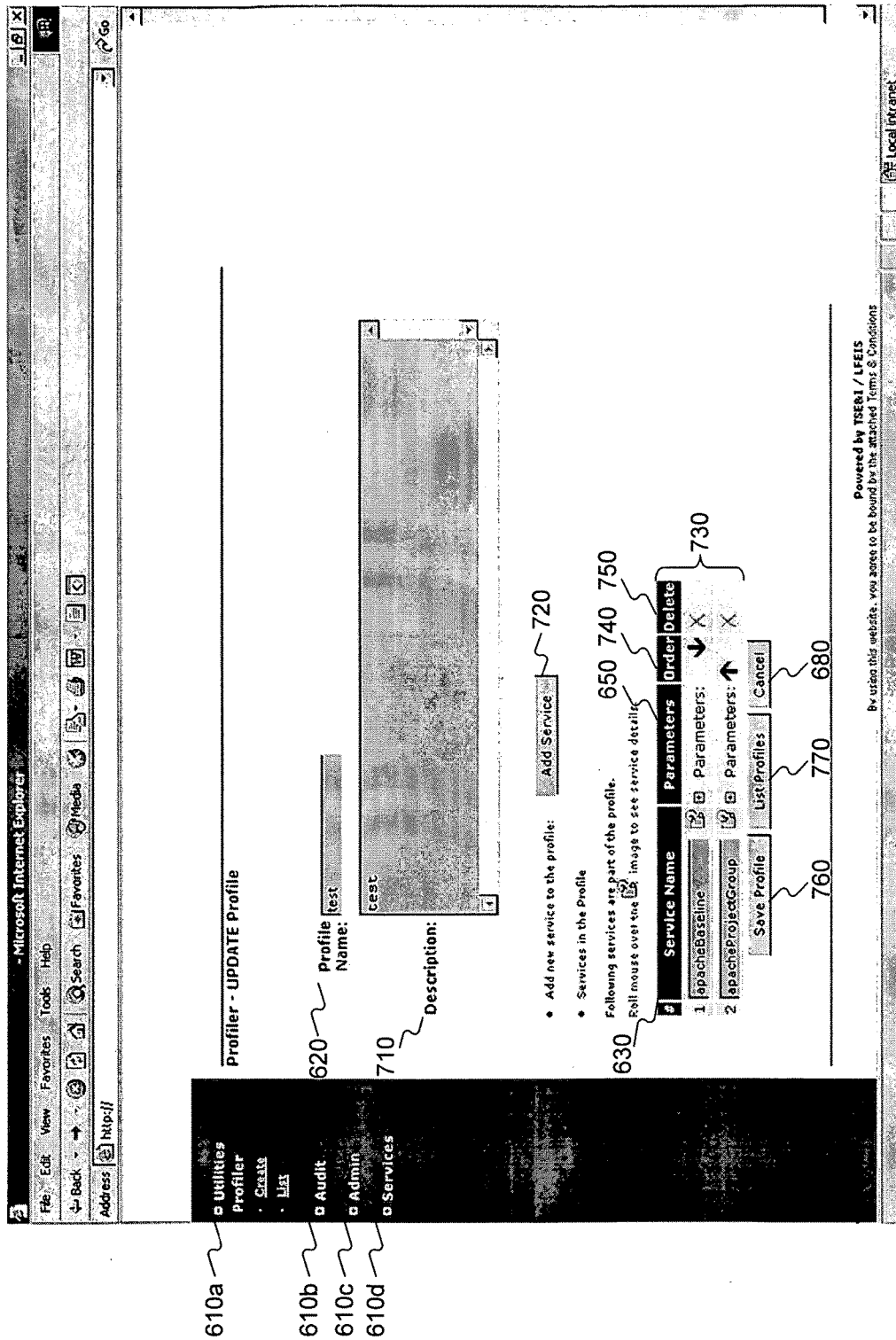
FIG. 7 illustrates an exemplary user interface for updating a profile, consistent with certain aspects related to the present invention.

As illustrated in FIG. 7, an update profile user interface 700 may indicate the profile name 620 being presented by client 110. The profile may include a profile description 710 that client 110 entered during the profile creation process, which may be updated with additional details to reflect any changes to the profile.

A listing of services 730 included in the profile may be provided to client 110. The services may be numbered and identified by service name 630. Client 110 may select to view the parameters 650 for each service, as well as the information entered for those parameters. For example, client 110 may select to add additional services (illustrated at 720) to the profile (step 530).

Client 110 may also update a profile by changing the order 740 of services using an up or down arrow displayed next to the service to be moved. The order of service orders may also be changed by altering the service number and using other techniques. Client 110 may delete 750 a service from the profile by, for example, selecting the "X" beside the service name 630 to be removed. ApacheBaseline service 630 shown in the listing of services 730 may install Apache® onto a computer 140, including creation of an application root directory, document root directory, and a covalent root directory. An application root directory may indicate where the root of an application is installed on computers in the configured environment. For example, if Apache® is being provisioned on computers 140a-c, the application root directory may identify the location on those computers for installing an Apache® baseline. A document root director may identify the directory on computers 140a-c where files are stored. For example, if the provisioned software product is a web server, the document root directory may store the html code used to build webpages that the web server provides. A covalent root directory may be a directory stored on computers 140a-c that is used by a vendor supporting the provisioned software product. ApacheProjectGroup service 630 may install Apache® onto computer 140 for a particular software development project and may be associated with clients 110 having access to the software development project.

Figure 8:
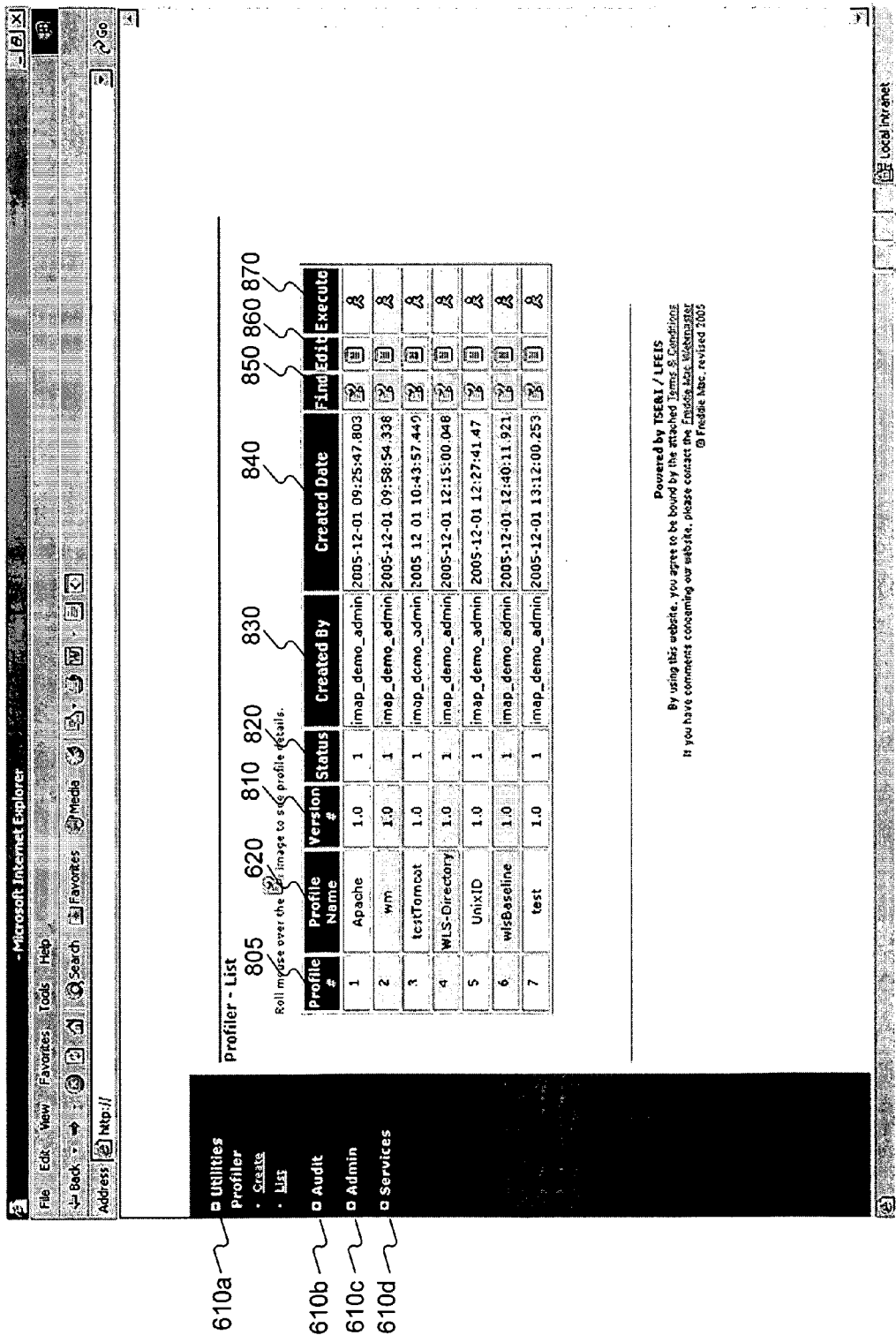
FIG. 8 illustrates an exemplary user interface for listing available profiles, consistent with certain aspects related to the present invention.

Once client 110 has made the desired changes to the profile, client 110 may save the profile 760 to a database, such as database 310. Client 110 may also view a list of all profiles 770 to which client 110 has access. Depending on the role and resource authorizations, client 110 may be authorized to view, execute, and/or edit profiles. FIG. 8 illustrates an exemplary list of all profiles 770 to which client 110 has access. The list may indicate a profile number 805; profile name 620; a version number 810; status 820 (e.g., indicate whether a profile is enabled—installed and available for use by client 110, disabled—installed but not available for use by client 110, or pending—installed but not yet approved for use by client 110); created by 830 (e.g., which client created the profile); and the created date 840 for the profile. Client 110 may access additional information, such as the profile description and services included in the profile, using find link 850. Client 110 may select edit 860 to edit, e.g., update, a profile, as discussed with respect to FIG. 7 above. Client 110 may also execute one or more profiles selected using an execute link 870.

At step 550 (FIG. 5), client 110 may configure an environment by identifying computers 140a-c and reserving specific ports at computers 140a-c for use in fulfilling a profile. Port reservation may be available to only a specific type of client 110, such as service administrators. To reserve a port, client 110 may select the "services" link 610 (FIG. 6) and provide a project name, product name, computer 140 name, and port number at computer 140 to use for fulfilling the profile. Reserved ports may be saved for a particular profile, allowing use of the reserved ports by a client 110 when executing the profile. Once client 110 reserves ports, these ports may be stored in database 310 and/or provided to a system administrator at client 110 for use during profile execution. When using these ports to fulfill profiles, the ports may be indicated as "in use," and other additional clients may be prohibited from using those ports. Client 110 may view a listing of all ports 660 that indicates whether a port is available, in use, or reserved. In some implementations, step 530 may not be performed when provisioning framework 130 automatically identifies and assigns ports when executing services of a profile.

At step 560 (FIG. 5), client 110 may create a new profile from an existing profile. Client 110 may wish to create a new profile from an existing profile to avoid the tedious tasks of entering the environment in detail, while maintaining the previous profile in profiler 325. In this example, both profiles for the existing and new environment must have similar configurations. Often the new profile will be updated by client 110. For example, client 110 may wish to reorder the services in the profile or change the parameters that a service in the profile receives.

Figure 9:
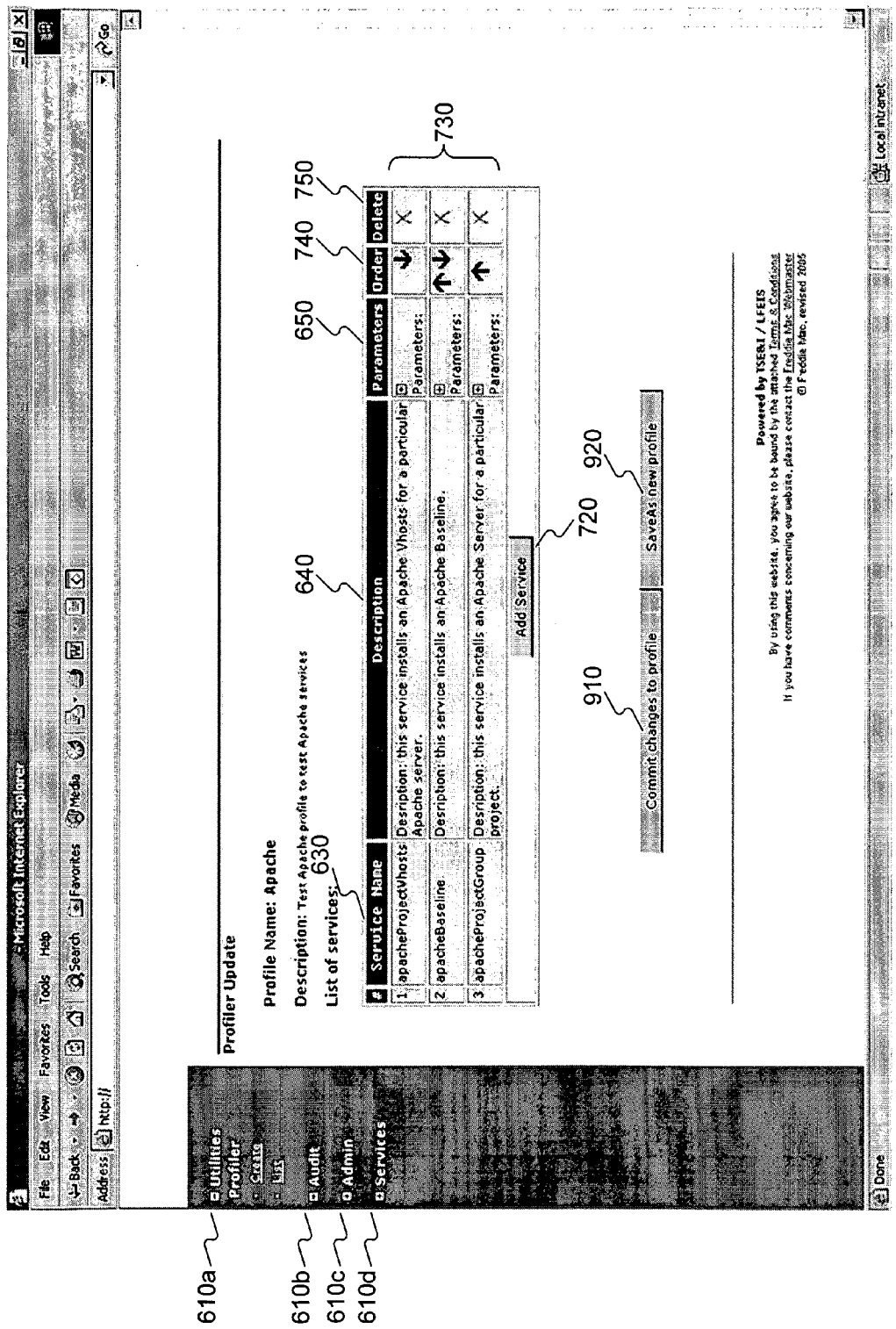
FIG. 9 illustrates an exemplary user interface for updating a profile, consistent with certain aspects related to the present invention.

As illustrated in FIG. 9, client may be allowed to update a profile by, for example, updating parameters 650 of services, adding new services 720, reordering services 740, and deleting services 750.

At step 570 (FIG. 5), client 110 may save profiles into profiler 325. Client 110 may save any profile that has been created or updated to ensure that the profile will be available for future testing and provisioning. With respect to FIG. 9, once client 110 has made changes to a profile, client 110 may commit the changes to the profile 910 when the client 110 is authorized to do so. Client 110 may also save the profile, including the changes, as a new profile using link 920. If the user selects to save as a new profile 920, client 110 may be prompted to provide the new profile with a new name. Client 110 may also update the description to reflect the changes to the new profile. The new profile may then be updated as described above.

At step 580 (FIG. 5), client 110 may execute one or more of the profiles that client 110 is authorized to execute. As seen in FIG. 8, users may execute a profile by selecting an execute link 870, which causes profiler 325 to provide the sequence of services to service invoker 340 for execution. Client 110 may choose to execute profiles multiple times. When executing a profile, client 110 may override the default values for the parameters 650, enter new information for parameters 650, remove information from optional parameters 650, and otherwise customize execution of the profile. Each time profiler 325 executes a profile, parameters 650 specified for the execution may be stored by log daemon 315 for future reference.

FIG. 10 illustrates an exemplary user interface 1000 for executing services. FIG. 10 depicts the lower portion of the FIG. 7 update profile user interface, with service parameters 650 expanded for selection and entering of values by client 110. Client 110 may identify, using drop-down list 1010, that client 110 will execute the service as a web manager (run-as user). When executing a profile, client 110 may specify the project name, specify computers 140a-c to use (field 1030), specify the environment name, and specify the environment type when executing the services in the profile. Client 110 may also update and select port numbers from a drop down-list of available ports 1020 for each service for a particular server 1030 (e.g., computer 140). Client 110 may select ports to use from a drop-down list of available ports for the computers 140a-c selected in field 1030. Client 110 may also update the document root field 1040, which may indicate the document root directory, such as a root directory for storing html code used to provide a webpage.

Client 110 may validate the configuration of a profile prior to execution, including the order of executing services and the required parameters for the services. Client 110 may validate the configuration by receiving from profiler 325 a confirmation that indicates the configuration. Client 110 may review the confirmation to ensure that the services and environment configured in the manner that client 110 wishes to use. If the configuration is valid, client 110 may select to execute the profile 870. If the configuration is not valid, for example, client 110 incorrectly selected a port at computer 140 that is unavailable, client 110 may then make any additional corrections as necessary and execute the profile 870.

At step 590, client 110 may view log reports that indicate the results of executing the profiles (step 580). Log reports may be available using the link 610b labeled "Audit." All operations performed may be logged into database 310 using log daemon 315. Logs in database 310 may be searched by client 110. For example, client 110 may search for all log reports created within a date range, for a specific project, for a specific environment configuration, etc.

FIG. 11 illustrates a user interface showing an exemplary log 1100. Log 1100 may indicate, for example, the date of execution 1105 of a profile, time of execution 1110, action 1115, feature 1120, virtual environment used for execution 1125, tier 1130, host 1135, engineer 1140 (e.g., a user at client 110), details 1145, status 1150, and a link to log 1155. Action 1115 may represent the component of system 100 that sent a message to log daemon 315. For example, if the logging message was the result of provisioning an application, then action 1115 may indicate build (e.g., compile), deploy (install), or bounce (delete). If the logging message was the result of an infrastructure or middleware provisioning operation, action 1115 may represent the service invoker 330 component that sent the message. Feature 1120 may represent the name of a project, such as a pricing project. Vrt_env 1125 may indicate the name of the virtual environment for provisioning of an application, such as development 1, development 2, etc. Vrt_env 1125 may be the environment for which the logged service was executed in the case of an infrastructure or middleware operation. Tier 1130 may be used to indicate additional information regarding the layer (e.g., low, medium, high) of the service being executed, or may simply be a place holder. Host 1135 may be the host or server that sends the logging message; engineer 1140 may be the name of the engineer executing the profile that was logged; details 1145 may specify the reason for a success, warning, failure of execution of a service; status 1150 may indicate the status of execution of a service; and link to logs 1155 may provide a link to a more detailed log for execution of a profile, including the results of executing each of the services in the profile.

In addition to the exemplary log 1100, additional log reports may be available to list all services that were run on each computer 140, the parameters 650 used to execute those services, project name, and a status of the services which may indicate return code from the service, such as warning, failure, and success. The log reports for services may also indicate when services were updated and which client 110 updated the services.

Figure 12:
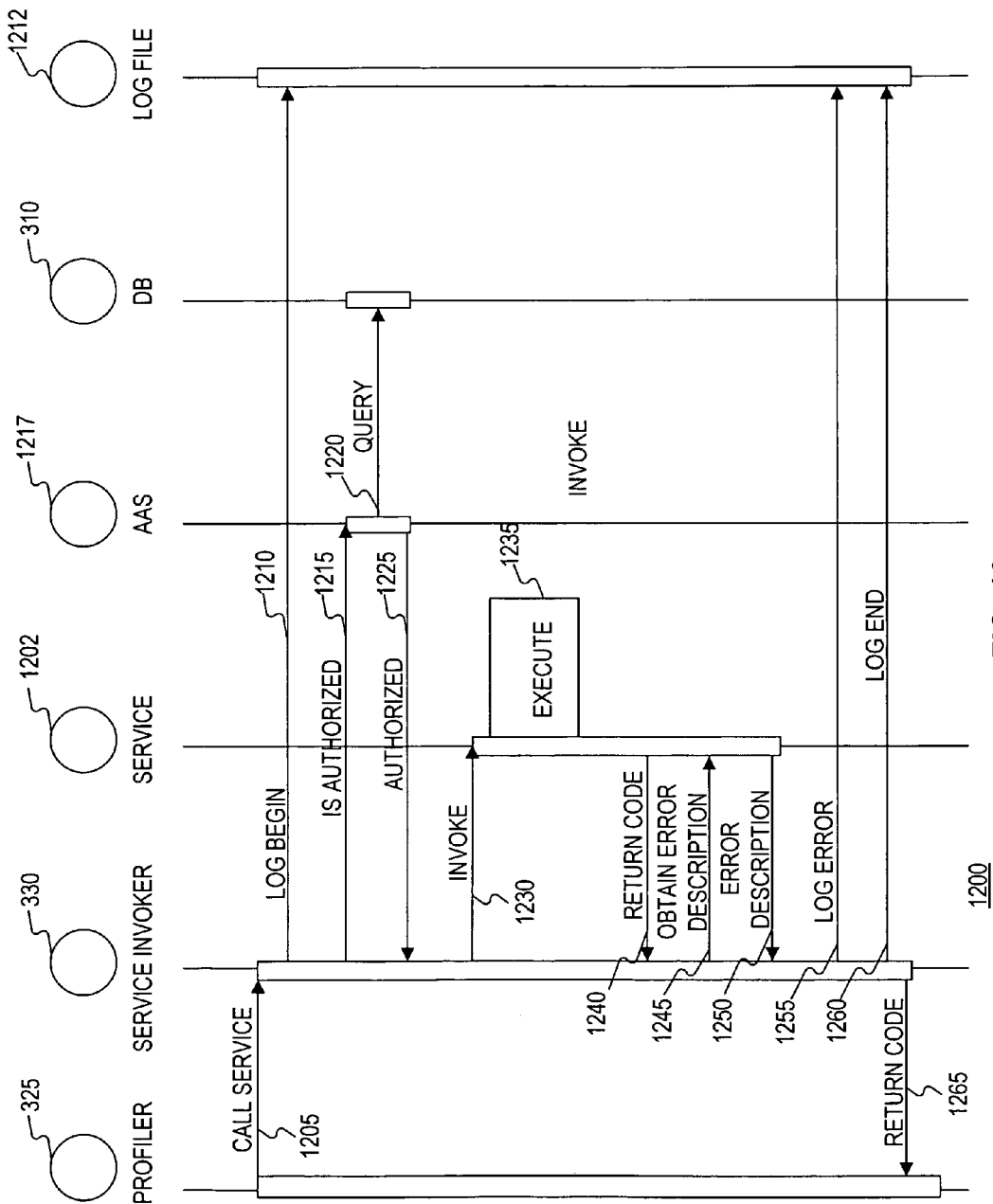
FIG. 12 illustrates a flowchart of an exemplary method for executing services, consistent with certain aspects related to the present invention.

FIG. 12 illustrates an exemplary sequence diagram 1200 of an authorized invocation by profiler 325 to execute a service (e.g., FIG. 5 at step 580). In the example of FIG. 12, the return code may be negative, which may indicate that an error has occurred. If the return code is, for example, zero, this may indicate that the service successfully executed in the environment.

At step 1205, profiler 325 may send a call to service invoker 330 for a service 1202 to be executed. Service invoker 330 may instruct log daemon 315 to begin logging the call to a log file 1212 (step 1210).

At step 1215, service invoker 330 may determine if client 110 is authorized to execute the requested service 1202 using AAS 1217 (Authentication Authorization Service). AAS 1217 may query database 310 to determine if client 110 is authorized to execute the requested service by, for example, matching the user identifier for client 110 to a record stored in database 310 and retrieving an authorization from the record (step 1220).

In the example of FIG. 12, AAS 1217 may determine that client 110 is authorized and notify service invoker 330 that client 110 (or a user therein) is authorized to access service 1102 (step 1225). However, if client 110 is not authorized, AAS 1217 may so notify service invoker 330, and service invoker 330 may abort execution of service 1202. Log daemon 315 may record the unauthorized attempt to execute service 1202 in log file 1212.

Service invoker 330 may then invoke service 1202 (step 1230) using the parameters 650 previously configured (see, e.g., FIG. 6). Service invoker 1202 may then be executed, and the results of the executed service may be returned to service invoker 330 as return code (steps 1235-1240).

When the return code indicates that an error occurred, service invoker 330 may then request and obtain from service 1202 an error description for the error code (steps 1245-1250). The error description may be stored as part of service 1202 in database, such as database 310. Service 1202 may return to service invoker 330 the obtained error description, and service invoker 330 may provide the error description to log daemon 315, which may log the error description to log file 1212 (step 1255). Logging may then end for this execution of service 1202 (step 1260), and the return code may be sent to profiler 325 (step 1265). Profiler 325 may then provide (also referred to as propagate) delivery of the return code to client 110.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments. For example, the user interface provided by client 110 may not be web-based, but rather may be stored locally on client 110.

Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

What is claimed is:

1. A method for provisioning a distributed software product using a web-based user interface, comprising:
   establishing, using the web-based user interface, a profile including a plurality of services, the profile being established to provision the distributed software product, the distributed software product using the plurality of services to execute, services performing a specific task;
   configuring an environment by specifying, in the profile, a plurality of computers to use for provisioning the plurality of services used to execute the distributed software product;
   identifying which computer from the plurality of computers to use for installing each service, the plurality of services being installed on more than one computer;
   provisioning the plurality of services on the identified computers in the configured environment, wherein selected services generate a return code indicating a status of the provisioning; and
   executing the distributed software product by:
      executing a first portion of the provisioned plurality of services on a client computer, including transmitting a first provisioning communication, between the client computer and a first host computer, wherein the first provisioning communication includes data for causing the first host computer to update the profile by modifying one or more ports of the first host computer previously reserved for executing the profile and data for re-provisioning the plurality of services in the first host computer based on modification of the one or more ports previously reserved for executing the profile;
      executing a second portion of the provisioned plurality of services on the first host computer, including transmitting a second provisioning communication, between the client computer and a second host computer; and
      executing a third portion of the provisioned plurality of services on the second host computer, including transmitting a third provisioning communication, between the first and second host computers.

2. The method of claim 1, wherein establishing the profile comprises:
   providing services that may be added to the profile, the services including services that a client is authorized to use; and
   receiving an indication from the web-based user interface of which services have been selected for inclusion in the profile.

3. The method of claim 1, wherein configuring the environment comprises:
   obtaining available ports on the specified plurality of computers to enable identification of one of the available ports to use when accessing the specified plurality of computers.

4. The method of claim 1, further comprising:
   specifying a run-as user for provisioning the services, the run-as user identifying an authorization to provision services that has been granted to another user.

5. The method of claim 1, further comprising:
   obtaining parameters required to provision the services, wherein the provisioning is based on the obtained parameters.

6. The method of claim 1, further comprising at least one of:
   updating the profile by adding additional services to the profile;
   changing the order of provisioning the services;
   changing values for parameters of a service; and
   removing a service from the profile.

7. The method of claim 1, further comprising:
   storing the profile in a database to enable the stored profile to be retrieved for generating another profile; and
   generating, based on the stored profile, another profile.

8. The method of claim 1, wherein provisioning comprises:
   performing at least one of the following functions: testing, executing, and configuring the services.

9. The method of claim 1, further comprising:
   implementing at least one of the services as a middleware provisioning service.

10. The method of claim 1, further comprising:
    implementing at least one of the services as an infrastructure provisioning service.

11. A non-transitory computer readable medium comprising a set of instructions which, when executed on a processor, perform a method for provisioning a distributed software product using a web-based user interface, the method comprising:
- establishing, using the web-based user interface, a profile including a plurality of services, the profile being established to provision the distributed software product, the distributed software product using the plurality of services to execute, services performing a specific task;
- configuring an environment by specifying, in the profile, a plurality of computers to use for provisioning the plurality of services used to execute the distributed software product;
- identifying which computer from the plurality of computers to use for installing each service, the plurality of services being installed on more than one computer;
- provisioning the plurality of services on the identified computers in the configured environment, wherein selected services generate a return code indicating a status of the provisioning; and
- executing the distributed software product by:
  - executing a first portion of the provisioned plurality of services on a client computer, including transmitting a first provisioning communication, between the client computer and a first host computer, wherein the first provisioning communication includes data for causing the first host computer to update the profile by modifying one or more ports of the first host computer previously reserved for executing the profile and data for re-provisioning the plurality of services in the first host computer based on modification of the one or more ports previously reserved for executing the profile;
  - executing a second portion of the provisioned plurality of services on the first host computer, including transmitting a second provisioning communication, between the client computer and a second host computer; and
  - executing a third portion of the provisioned plurality of services on the second host computer, including transmitting a third provisioning communication, between the first and second host computers.

12. The non-transitory computer readable medium of claim 11, wherein establishing the profile comprises:
- providing services that may be added to the profile, the services including services that a client is authorized to use; and
- receiving an indication from the web-based user interface of which services have been selected for inclusion in the profile.

13. The non-transitory computer readable medium of claim 11, wherein configuring the environment comprises:
- obtaining available ports on the specified plurality of computers to enable identification of one of the available ports to use when accessing the specified plurality of computers.

14. The non-transitory computer readable medium of claim 11, wherein the method further comprises:
- specifying a run-as user for provisioning the services, the run-as user identifying an authorization to provision services that has been granted to another user.

15. The non-transitory computer readable medium of claim 11, wherein the method further comprises:
- obtaining parameters required to provision the services, wherein the provisioning is based on the obtained parameters.

16. The non-transitory computer readable medium of claim 11, wherein the method further comprises at least one of:
- updating the profile by adding additional services to the profile;
- changing the order of provisioning the services;
- changing values for parameters of a service; and
- removing a service from the profile.

17. The non-transitory computer readable medium of claim 11, wherein the method further comprises:
- storing the profile in a database to enable the stored profile to be retrieved for generating another profile; and
- generating, based on the stored profile, another profile.

18. The non-transitory computer readable medium of claim 11, wherein provisioning comprises:
- performing at least one of the following functions: testing, executing, and configuring the services.

19. The non-transitory computer readable medium of claim 11, wherein the method further comprises:
- implementing at least one of the services as a middleware provisioning service.

20. The non-transitory computer readable medium of claim 11, wherein the method further comprises:
- implementing at least one of the services as an infrastructure provisioning service.

21. A system, comprising:
- a memory; and
- a processor, wherein the processor is configured to perform a method for provisioning a distributed software product using a web-based user interface, the method comprising:
  - establishing, using the web-based user interface, a profile including a plurality of services, the profile being established to provision the distributed software product, the distributed software product using the plurality of services to execute, services performing a specific task;
  - configuring an environment by specifying, in the profile, a plurality of computers to use for provisioning the plurality of services used to execute the distributed software product;
  - identifying which computer from the plurality of computers to use for installing each service, the plurality of services being installed on more than one computer;
  - provisioning the plurality of services on the identified computers in the configured environment, wherein selected services generate a return code indicating a status of the provisioning; and
  - executing the distributed software product by:
    - executing a first portion of the provisioned plurality of services on a client computer, including transmitting a first provisioning communication, between the client computer and a first host computer, wherein the first provisioning communication includes data for causing the first host computer to update the profile by modifying one or more ports of the first host computer previously reserved for executing the profile and data for re-provisioning the plurality of services in the first host computer based on modification of the one or more ports previously reserved for executing the profile;

executing a second portion of the provisioned plurality of services on the first host computer, including transmitting a second provisioning communication, between the client computer and a second host computer; and executing a third portion of the provisioned plurality of services on the second host computer, including transmitting a third provisioning communication, between the first and second host computers.

22. The system of claim 21, wherein establishing the profile comprises:

providing services that may be added to the profile, the services including services that a client is authorized to use; and receiving an indication from the web-based user interface of which services have been selected for inclusion in the profile.

23. The system of claim 21, wherein the method performed by the processor further comprises at least one of:

updating the profile by adding additional services to the profile;

changing the order of provisioning the services;

changing values for parameters of a service; and removing a service from the profile.

\* \* \* \* \*